US009529899B2

(12) United States Patent
Hao et al.

(10) Patent No.: US 9,529,899 B2
(45) Date of Patent: Dec. 27, 2016

(54) VISUALIZING MOTIFS WITH VISUAL STRUCTURES

(75) Inventors: Ming C. Hao, Palo Alto, CA (US); Manish Marwah, Palo Alto, CA (US); Umeshwar Dayal, Saratoga, CA (US); Halldór Janetzko, Constance (DE); Ratnesh Kumar Sharma, Fremont, CA (US); Daniel Keim, Steisslingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 1753 days.

(21) Appl. No.: 12/924,870

(22) Filed: Oct. 7, 2010

(65) Prior Publication Data

US 2012/0089941 A1    Apr. 12, 2012

(51) Int. Cl.
G06F 3/00 (2006.01)
G06F 9/00 (2006.01)
G06F 17/00 (2006.01)
G06F 17/30 (2006.01)

(52) U.S. Cl.
CPC .............................. *G06F 17/30716* (2013.01)

(58) Field of Classification Search
CPC ............ G06F 9/4443; G06F 8/34; G06F 8/38; G06F 3/048; G06F 3/041; G06F 3/021; G06F 3/016; G06F 1/1616; G06F 1/1626; G06F 3/0482; G06F 3/04847; G06F 3/0488
USPC ............... 715/762, 763, 764, 765, 766, 781, 783, 715/866, 833
See application file for complete search history.

(56) References Cited

U.S. PATENT DOCUMENTS

| | | | |
|---|---|---|---|
| 6,745,130 B2 | 6/2004 | Kawanishi | |
| 7,716,227 B1 * | 5/2010 | Hao et al. | 707/748 |
| 2007/0274593 A1 * | 11/2007 | Tsuneta et al. | 382/192 |
| 2009/0216968 A1 * | 8/2009 | Martin et al. | 711/161 |
| 2009/0262131 A1 | 10/2009 | Suntinger | |
| 2010/0010985 A1 | 1/2010 | Wong | |
| 2010/0033485 A1 * | 2/2010 | Kothari et al. | 345/440 |
| 2010/0182221 A1 * | 7/2010 | Kaule et al. | 345/9 |

OTHER PUBLICATIONS

Ratnesh Kumar Sharma et al., "Determining Operational Settings for Fluid Moving Devices," U.S. Appl. No. 12/632,682, filed Dec. 7, 2009 (29 pages).

(Continued)

*Primary Examiner* — Kieu Vu
*Assistant Examiner* — Anita D Chaudhuri
(74) *Attorney, Agent, or Firm* — Trop, Pruner & Hu, P.C.

(57) ABSTRACT

Visual structures are produced to represent corresponding motifs, where the motifs correspond to repeating patterns in an input data set, where sizes of the visual structures are based on values of a characteristic associated with the motifs, and where a first of the motifs is nested within a second of the motifs to represent a hierarchical relationship of the patterns represented by the first and second motifs. The visual structures of corresponding motifs are presented for display in a visualization screen, where the visualization screen depicts the data in the input data set with the visual structures overlapping parts of depicted data. Interactive input is received specifying modification of a region containing motifs, wherein the specified modification includes interactive distortion of the visual structures in the region to change a size of the visual structures in the region.

19 Claims, 7 Drawing Sheets
(4 of 7 Drawing Sheet(s) Filed in Color)

(56) References Cited

OTHER PUBLICATIONS

Romer, "Discovery of Frequent Distributed Event Patterns in Sensor Networks," 2008 (18 pages).
Mueen et al., "Exact Discovery of Time Series Motifs," pp. 473-484 (Apr. 2009).
Patel et al., "Mining Motifs in Massive Time Series Databases," 2002 (8 pages).
Castro et al., "Multiresolution Motif Discovery in Time Series," 2008, pp. 665-676.
Lin et al., "VizTree: a Tool for Visually Mining and Monitoring Massive Time Series Databases," 2004, pp. 1269-1272.

* cited by examiner

VISUALIZING MOTIFS WITH VISUAL STRUCTURES

BACKGROUND

An enterprise (such as a company, educational organization, government agency, and so forth) can collect or maintain relatively large amounts of data. For example, sensors associated with various equipment may be continually measuring data regarding the equipment. Analyzing such relatively large amounts of data can be challenging.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures:

FIG. 8 illustrates blocks involved in generating visualization of motifs according to further embodiments.

DETAILED DESCRIPTION

An input data set, such as a time series of data or other type of data collection, can represent an input stream of events that are associated with patterns, often referred to as motifs. As used here, a "motif" refers generally to a repeating pattern that exists within an input data set. Motifs that are present in an input data set are generally not known a priori. Thus, if there is a relatively large amount of data in the input data set, recognizing and visualizing such motifs in the input data set can be challenging. Motif discovery can be used to reveal trends, relationships, anomalies, and/or assist users in performing various evaluation and knowledge discovery.

Figure 1:
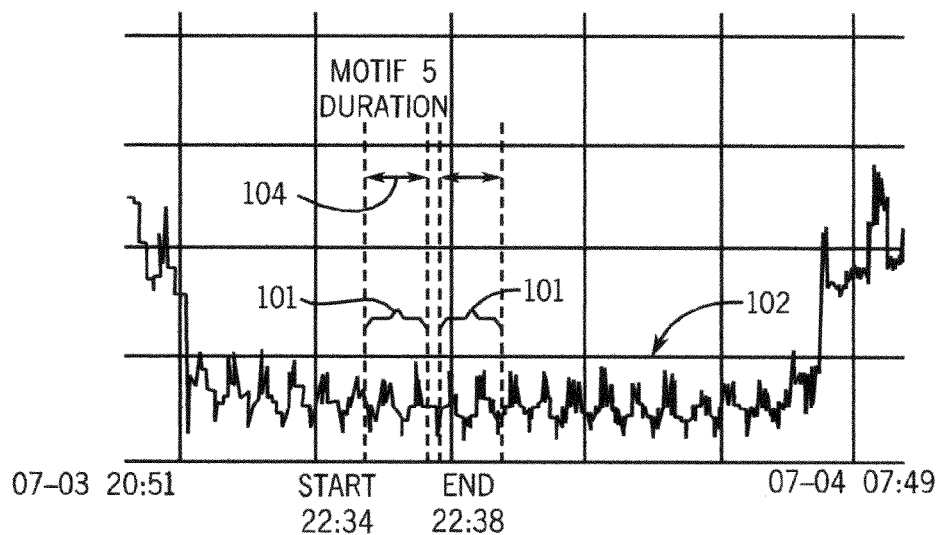
FIG. 1 is a timing diagram illustrating a curve representing a time series having motifs capable of being visualized according to some embodiments.

In accordance with some embodiments, techniques or mechanisms are provided to visualize motifs that are present in an input data set. FIG. 1 illustrates a curve 102 that represents an example time series of data items (the horizontal axis represents time and the vertical axis represents an attribute value of the data items). A repeating pattern 101 (identified as "motif 5" in FIG. 1) is present in the time series represented by the curve 102. Motif 5 has duration 104. As is apparent from the curve 102 of FIG. 1, the pattern 101 represented by motif 5 repeats along the time series represented by the curve 102, such that there is a sequence of motifs 5.

Figure 2:
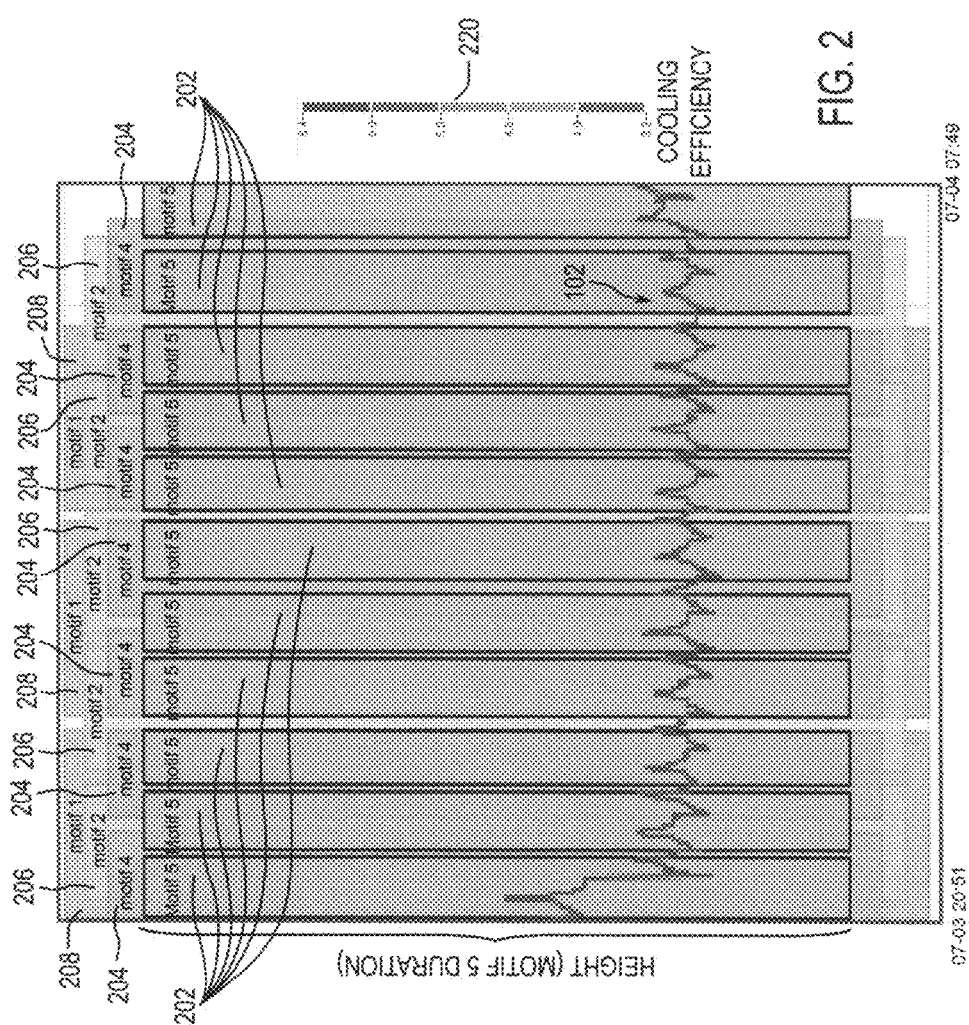
FIG. 2 depicts a graphical visualization of motifs in the time series represented in FIG. 1, in accordance with some embodiments.

To provide a convenient and effective visualization of motifs, any identified motifs within an input data set can be represented using visual structures (e.g., rectangles or structures of other shapes). FIG. 2 depicts visual structures 202 (in the form of rectangles) that represent corresponding motifs 5. The size of each visual structure 202 (e.g., the height of each rectangle) is based on a value of a characteristic of each motif 5. In some examples, the characteristic is the a time duration of the motifs 5 (e.g., average time duration of the motifs 5, mean time duration of the motifs 5, or some other aggregate time duration of the motifs 5). Note that FIG. 2 also shows the curve 102 that is depicted in FIG. 1.

Within the time series represented by the curve 102, there can be other motifs corresponding to other patterns. For example, the time series can have multiple types of motifs of different time durations. Motifs 5 have first time durations. Other types of motifs can have longer or shorter time durations that correspond to other patterns in the time series.

In FIG. 2, such other motifs include motifs 4 (represented by visual structures 204), motifs 2 (represented by visual structures 206), and motifs 1 (represented by visual structures 208). The visual structures 204, 206, and 208 are rectangles according to some examples. The motifs 4 are of longer durations than motifs 5, the motifs 2 are of longer durations than motifs 4, and the motifs 1 are of longer durations than motifs 2. As a result, the height of the rectangles 204 representing motifs 4 is greater than the height of rectangles 202 representing motifs 5. Similarly, the heights of the rectangles 206 and 208 are progressively larger since they represent motifs of longer time durations. In the FIG. 2 example, motif 5 can be considered to be nested within motif 1, since the visual structure 202 of each motif 5 is completely within the visual structure 208 of the corresponding motif 1. Motif 4 can also be considered to be nested within a respective motif. The nesting of motifs within other motifs depicts hierarchical relationships among the motifs. For example, the pattern corresponding to each motif 5 occurs within a larger pattern corresponding to the respective motif 1, which indicates that motif 5 is a pattern that occurs within a larger pattern. This hierarchical arrangement of motifs allows for the identification of larger motifs that contain smaller motifs such that superset patterns in an input data set that contain smaller patterns can be identified. Motif 4 is also nested within motif 1. A hierarchical relationship between motifs refers to whether one motif is contained within another motif. Motif 2 is not nested within another motif, but rather overlaps motifs 1, 4, and 5.

Colors can be assigned to the visual structures, where each of the assigned colors represents an attribute of the data associated with the corresponding motif. For example, in FIG. 2, a color scale 220 maps different colors to different values of cooling efficiency. In the FIG. 2 example, cooling efficiency is an example of the attribute of data associated with the corresponding motif that is used to assign color to the corresponding motif. Dark blue corresponds to higher cooling efficiency, while dark red corresponds to lower cooling efficiency. By looking at the color of a visual structure of a motif, a user can quickly determine the characteristic associated with the data represented by the motif. For example, the user seeing the blue visual structures of FIG. 2 can easily determine that the patterns corresponding to such visual structures are associated with data items indicating relatively high cooling efficiencies.

Figure 3:
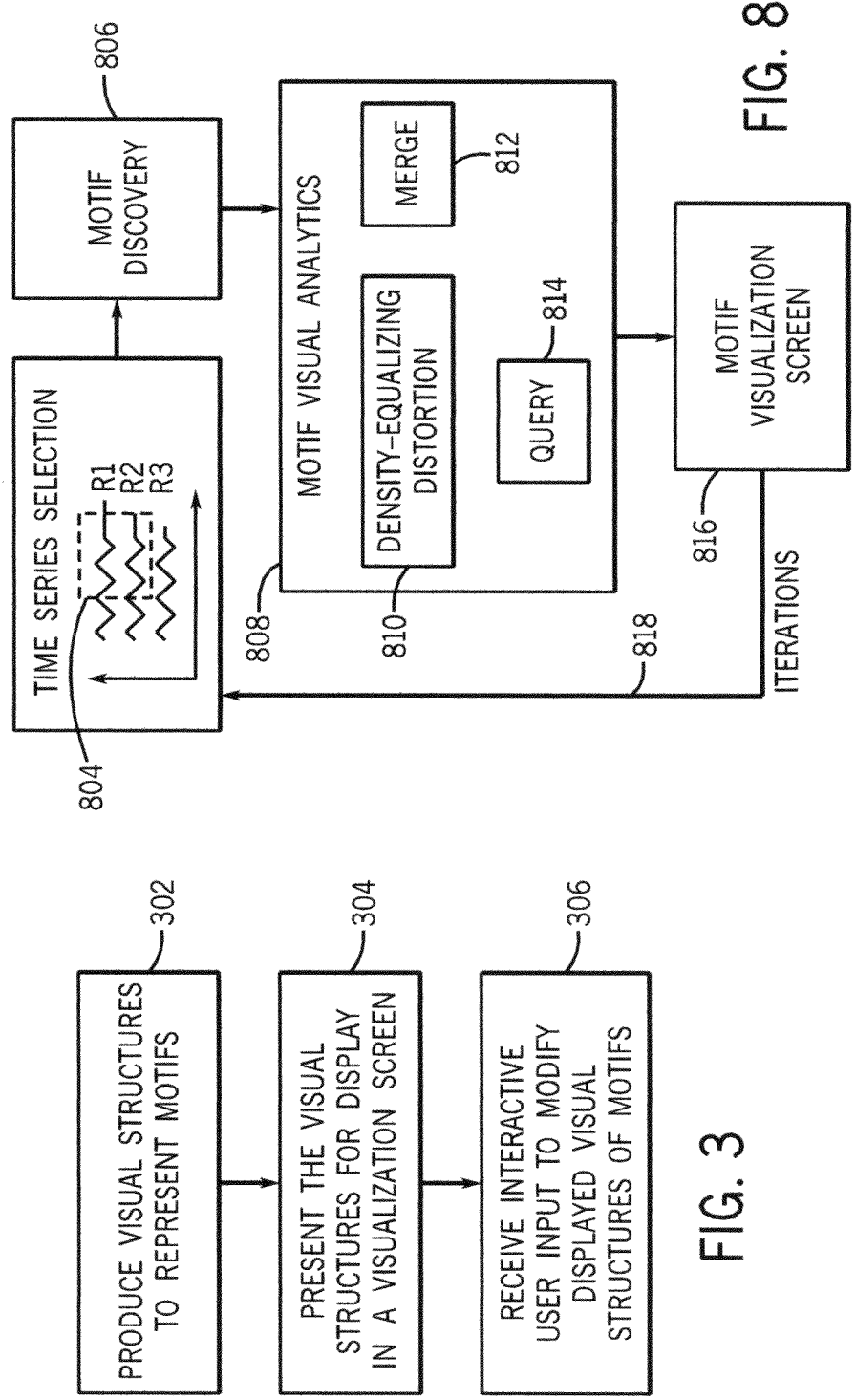
FIG. 3 is a flow diagram of a process of visualizing motifs according to some embodiments.

FIG. 3 is a general flow diagram of a process according to some embodiments. A system produces (at 302) visual structures to represent respective motifs that correspond to patterns in an input data set (e.g., time series), where sizes of the visual structures are based on values of a characteristic (e.g., time duration) associated with the motifs. Some of the motifs can be nested within others of the motifs to represent a hierarchical relationship of the patterns represented by the respective motifs.

The system presents (at 304) the visual structures of corresponding motifs for display in a visualization screen, wherein the visualization screen depicts the data in the input data set with the visual structures overlapping parts of depicted data. For example, in FIG. 2, the visual structures 202, 204, 206, and 208 overlap the curve 102 representing the data items of the input data set.

The system receives (at 306) interactive user input specifying modification of the displayed visual structures of the motifs. One such modification involves distortion of the visual structures, wherein the specified distortion causes the visual structures within a particular region to change in size. Another modification involves merging of visual structures representing motifs.

Figure 4:
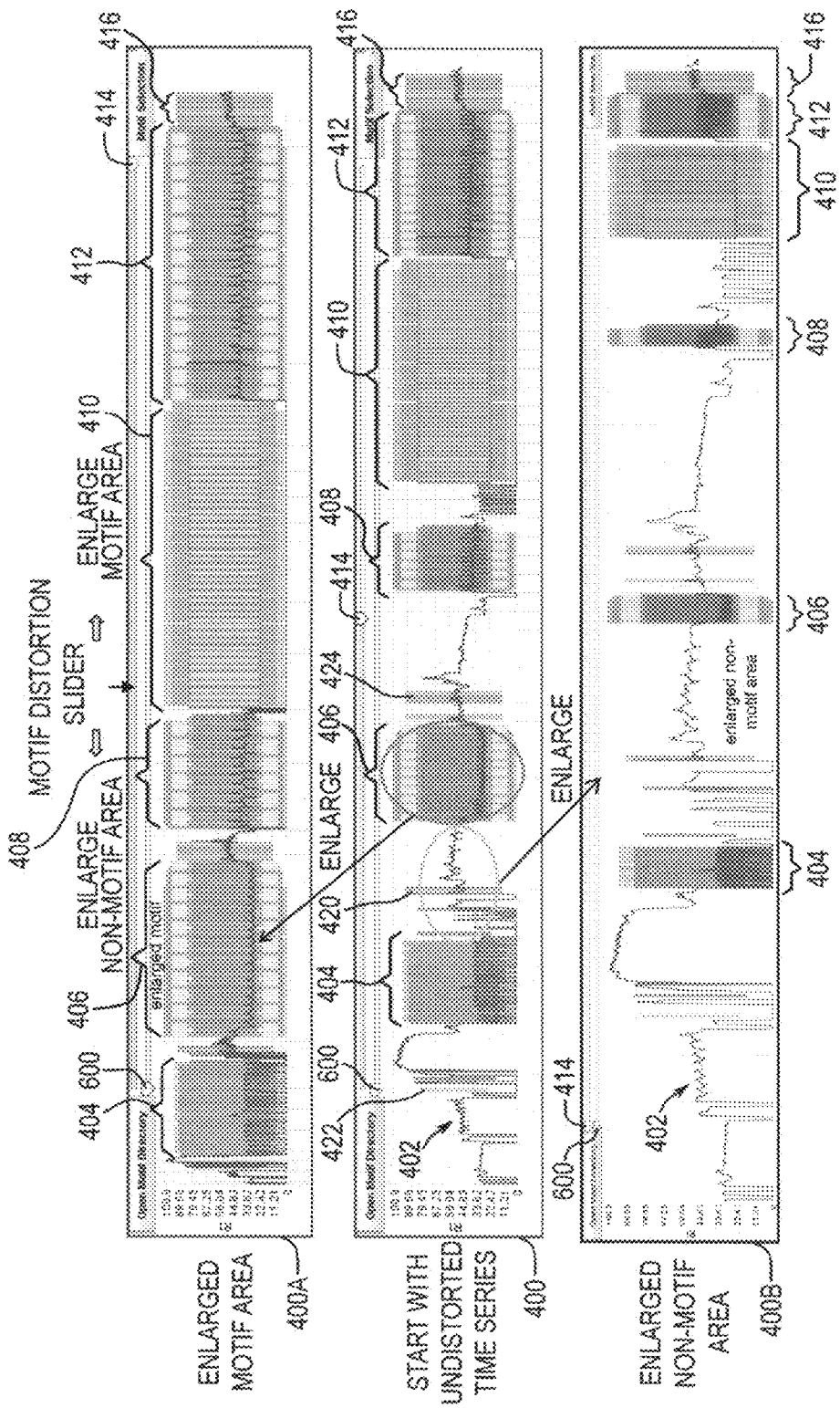
FIGS. 4, 6, and 7 illustrate various example visualization screens generated according to various embodiments.

FIG. 4 shows a visualization screen 400 that initially has an undistorted time series (represented by curve 402). Several motif regions 404, 406, 408, 410, 412, and 416 are depicted in the visualization screen 400, where each motif region has a relatively dense arrangement of motifs (corresponding to different patterns in the time series represented by the curve 402). The regions outside the motif-dense regions 404, 406, 408, 410, 412, and 414 are referred to as "non-motif regions." Note that a "non-motif region" can actually include sparse appearances of motifs, such as motifs 420, 422, and 424 in the visualization screen 400 in FIG. 4. Thus, a "non-motif region" refers to a region that has no motifs or has a relatively sparse number of motifs (less than some predefined number of motifs per particular time interval). A "motif region" has at least the predefined number of motifs per particular time interval (which means that the motif region has at least a predefined density of motifs).

As further shown in FIG. 4, a motif distortion slider 414 is provided in the visualization screen 400. The motif distortion slider 414 is user manipulatable by sliding the slider 414 left or right. Although the visualization screen 400 shows a horizontally slidable slider 414, note that in other examples, the slider 414 can be vertically slidable, or slidable in another direction. The presence of the slider 414 allows for the visualization screen 400 to be an interactive visualization screen that allows for interactive distortion of motif regions or non-motif regions in response to movement of the motif distortion slider 414.

If the motif distortion slider 414 is moved to the right, as shown in the visualization screen 400A of FIG. 4, then the motif regions (404, 406, 408, 410, 412, 416) are enlarged, as apparent in the visualization screen 400A. in FIG. 4 Enlargement of the motif regions leads to reduction in the sizes of the non-motif regions, as depicted in the visualization screen 400A.

On the other hand, if the motif distortion slider 414 is moved to the left, as shown in the visualization screen 400B of FIG. 4, then the non-motif regions are enlarged, while the motif regions (404, 406, 408, 410, 412, 416) are reduced in size.

By being able to selectively and interactively enlarge the motif regions or the non-motif regions, a user can better view further details associated with the enlarged regions.

In some implementations, distorting a time series (based on adjustment of the motif distortion slider 414) is performed by applying a density-equalizing distortion technique. The density-equalizing distortion technique is based on a calculation of weights as depicted in the pseudocode below.

```
Input: Array of motifs: Motif [ ] all Motifs
Output: Arrays of weight values:
    Weights Motifs // used for enlarging motif regions
    weightsNotMotifs // used for enlarging non-motif regions
weightsMotifs = new double[ number of timestamps ];
weightsNotMotifs = new double[ number of timestamps];
forEach Motif m : motifs do
    TimeInterval[ ] intervals = m.m_occurrences;
    forEach TimeInterval t : intervals do
        for i = t.startTime to t.endTime do
            weightsMotifs[ i ] += 1.0;
        end
    end
end
for i = 0 to number of timestamps do
    if weightsMotifs[ i ] > 0 then
        weightsNotMotifsArea[ i ]= 1 / weightsMotifs [i];
    else
        weightsNotMotifsArea[ i ] = 1.0;
    end
end
```

Figure 5:
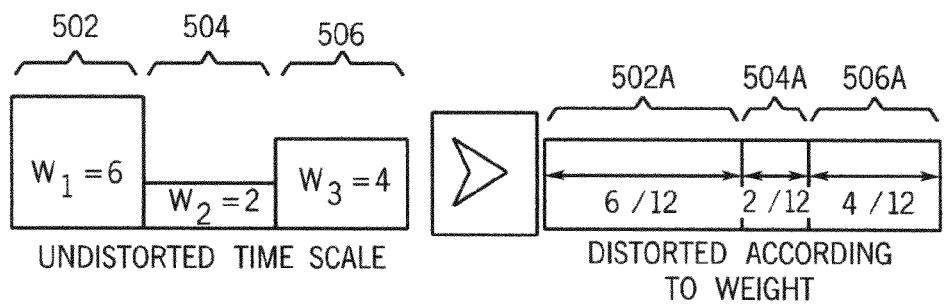
FIG. 5 illustrates distortion of parts of a time series, in accordance with some embodiments.

In accordance with some implementations, a time series is divided into multiple parts, where in some examples the multiple parts are equal-sized parts (have same time duration). For example, as shown in FIG. 5, a time series is divided into three parts 502, 504, and 506, each of the same time duration. In the pseudocode above, each occurrence of a motif has starting time (t.startTime) and ending time (t.endTime) and that this time interval between the starting time and ending time is used to count the number of the distinct motif occurrences in each time part. Weights are calculated for each time interval and the weights are used as an input to the distortion technique. These weights are based on the density of a particular type of motifs occurring in each part. The weights for enlarging both motif regions and non-motif regions within each corresponding part are calculated. In the pseudocode above, a weight for enlarging a motif region is represented as weightsMotifs, and a weight for enlarging a non-motif region is represented as weightsNotMotifs.

To enlarge the motif regions, the number of motifs in the corresponding part of the time series are used (weightsMotifs is equal to the number of motifs in the corresponding part). To enlarge the non-motif regions, the inverse of the number of motifs in the corresponding part is used (weightsNotMotifs is equal to the inverse of weightsMotifs). If there are no motifs in the corresponding part of the time series, then a constant weight (e.g., 1) is assigned to weightsNotMotifs (to avoid a divide by zero condition).

The distortion technique enlarges or shrinks parts of the time series according to the weights. As shown in FIG. 5, the parts 502, 504, and 506 of the time series are assigned corresponding weights $w_1, w_2, w_3$ (where each of $w_1, w_2, w_3$ corresponds to weightsMotifs in the pseudocode above). The distortion technique resizes each part according to the aggregated weight (e.g., sum of all weights) of the parts. The sum of $w_1, w_2$, and $w_3$ in FIG. 5 is 12 (aggregated weight), so that the distortion applied to parts 502, 504, and 506 results in distorted parts 502A, 502B, and 502C, where the length of each distorted part is proportional to the weight of the part divided by the aggregated weight. Thus, distorted part 502A has a length that takes up $6/12$ of the entire length, the distorted part 504A has a length that takes up $2/12$ of the entire length, and the distorted part 506A has a length that takes up $4/12$ of the entire length. Thus, effectively, the higher the weight of a particular part of the time series, the longer its length after distortion.

If the part 502 is a motif region, then the distortion of FIG. 5 would result in an enlarged part 502A (of longer time duration than 502). This enlargement of motif regions results from moving the slider 414 of FIG. 4 to the right, for example.

On the other hand, if non-motif regions are to be enlarged by moving the slider 414 to the left, then the weightsNotMotifs values are used as the weights instead, which would result in motif regions being shrunk and non-motif regions increasing in size.

In some implementations, the distortion technique first calculates a fully distorted view for each task (enlarging motif regions or enlarging non-motif regions based on moving the slider 414 fully to the right or left, respectively). After calculating the fully distorted view (for enlarging motif regions or enlarging non-motif regions), the distortion technique calculates the zero slider position (the middle position of the slider 414 depicted in visualization screen 400 in FIG. 4, for example). When the user moves the slider to the left, non-motif regions are enlarged, and when the user moves the slider to the right, motif regions are enlarged. For determining the distortion for the intermediate positions of the slider 414 (positions of the slider 414 between the middle position and the full right or left position), a weighted interpolation between the original scale and the fully distorted view can be used.

Figure 6:
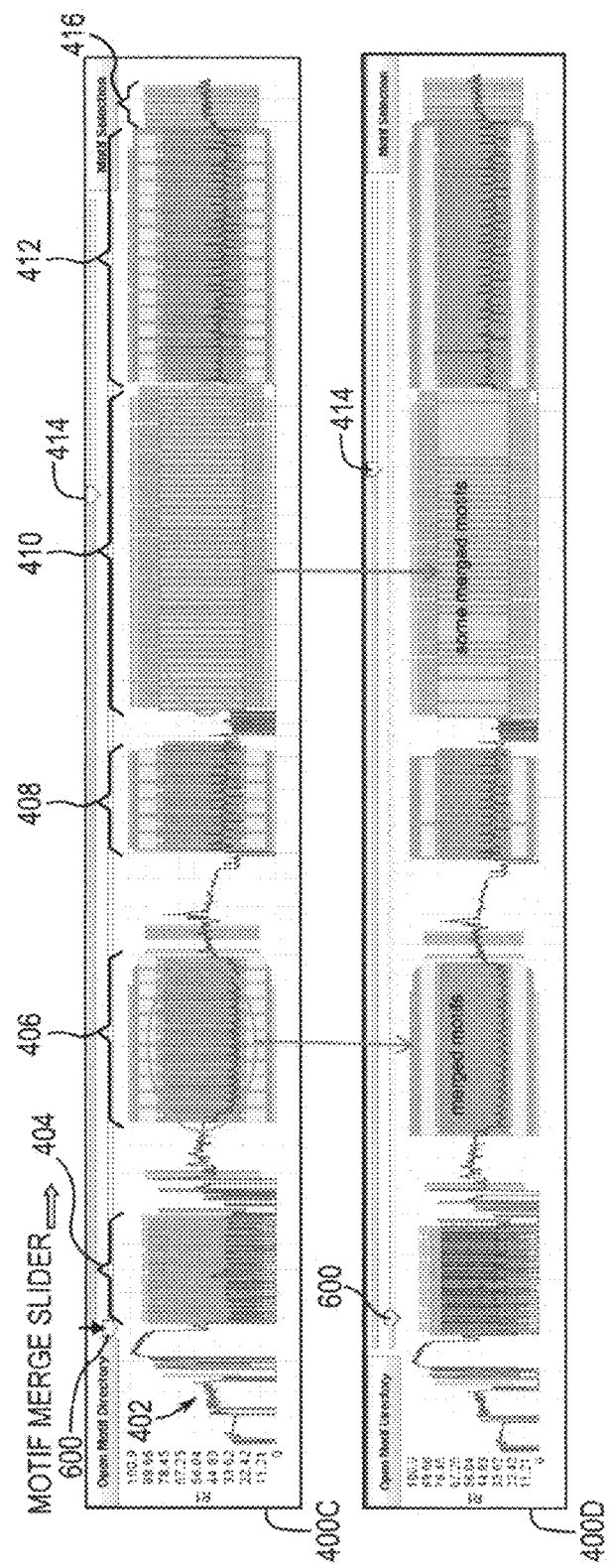

In accordance with some implementations, motifs (e.g., adjacent motifs of a particular type) can also be merged based on interactive input provided by a user. FIG. 6 depicts a visualization screen 400C that depicts the time series represented by the curve 402 (also shown in FIG. 4). In FIG. 6, the visualization screen 400C has the motif distortion slider 414 in an intermediate position (different from any of the visualization screens 400, 400A, and 400B in FIG. 4).

As further shown in FIG. 6 (and in FIG. 4), a motif merge slider 600 is provided. The motif merge slider 600 is also slidable by a user horizontally. In other examples, the motif merge slider 600 can be adjusted in different directions.

If the motif merge slider 600 is moved, motifs of the same type that begin or end at adjacent positions are combined. Two occurrences of the same motif are defined as adjacent if the time duration between those occurrences does not exceed a given threshold. The threshold is set by the user via a slider. For each motif, a minimum gap length is computed between the motif's occurrences and average values over all instances of the motif. Note that only the same types of motifs are merged. Users can mouse over the time series in a merged motif to display the current time interval and the efficiency measure value.

As depicted in visualization screen 400D of FIG. 6, the motif merge slider 600 has been moved some to the right, which has caused some of the motifs to be merged as depicted.

After applying various degrees of distortion and merging, the motif time series can be simplified and enhanced for further visual analysis.

Figure 7:
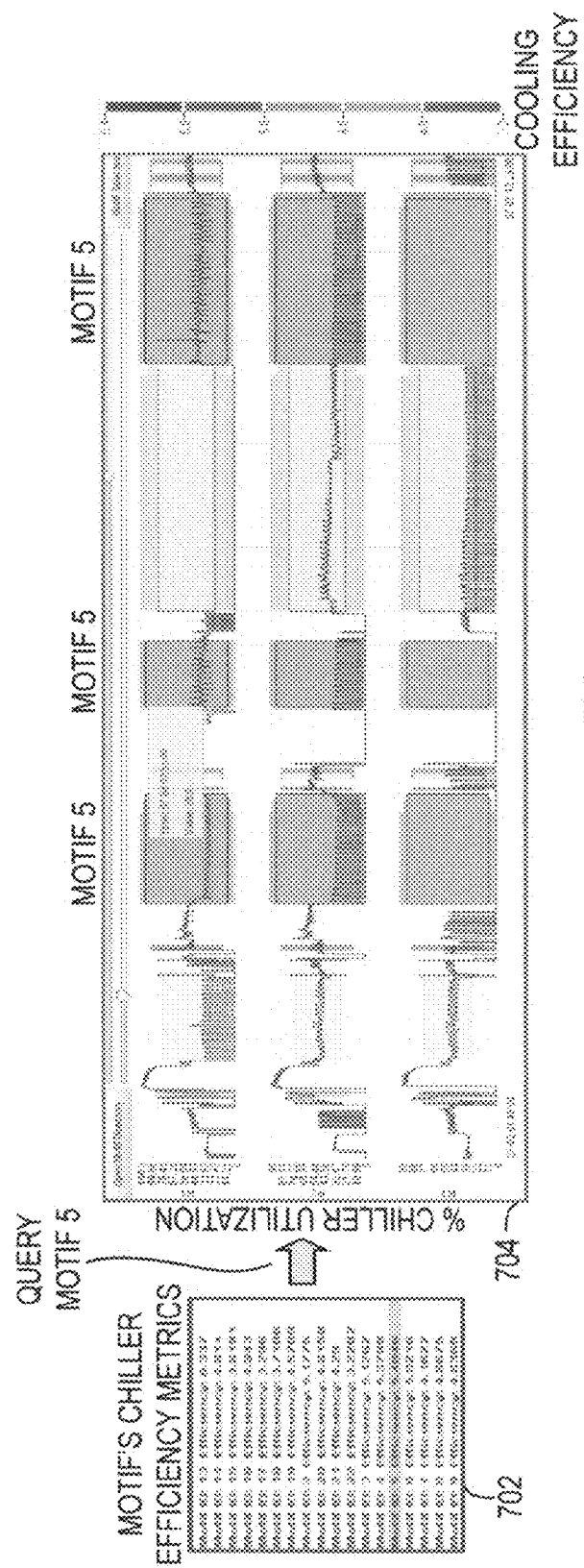

In certain situations, a user may have identified a motif of particular interest, and would like to see other occurrences of the same motif. In such situation, the user can submit a motif query, such as in the form depicted in FIG. 7. A listing 702 of motifs may be provided to a user, from which a user can select a motif of interest. In the example, the user has highlighted an entry containing motif 5. In response, a motif query is submitted, which can contain one or both of an identification (e.g., motif 5) of a motif of interest, or a value of interest (such as an efficiency value in the listing 702 of FIG. 7). The motif query causes a visualization 704 to be provided in which the selected motif (e.g., motif 5) is enlarged and highlighted (such as with a bolded box or some other highlighting graphic).

FIG. 8 depicts a process according to further embodiments. Multiple time series corresponding to multiple sources (e.g., multiple sensors) may be received, from which selection can be made. A user can select which time series are of interest (R1, R2, and/or R3, for example), and can select portions (such as indicated in dashed box 804) of the time series that are of interest.

The selection results in an input data set against which motif visualization is to be performed, in accordance with some implementations. Motif discovery (806) is performed to identify motifs, using any of various available motif discovery techniques.

After motif discovery (806), motif visual analytics (808) can be performed as discussed above. The motif visual analytics involves density-equalizing distortion (810), motif merging (812), and motif querying (814), as discussed above. The result of the motif visual analytics (808) is a visualization screen 816. Multiple iterations (818) can be performed based on interactive user input in the visualization screen 816.

In accordance with some examples, a layout technique of visual structures for motifs provided by the motif visual analytics (808) is depicted in the pseudocode below.

```
Input: Array of motifs: Motif [ ] allMotifs
HashMap <Motif, Integer> heightOfMotif =
        new HashMap <Motif, Integer> ( );
Motif [ ] allMotifsSorted = sort allMotifs according to
        average occurrence length in descending order;
// Calculate the height for each motif according to the statistical rank
for i = 0 to allMotifsSorted.length do
    heightOfMotif.put(allMotifsSorted[i],
        Math.round(((allMotifsSorted.length – 1.0) – i) /
        (motifsSorted.length – 1.0) * heightOfLineChart / 2.0));
end
// Draw all occurrences of each motif
forEach Motif m : allMotifsSorted do
    TimeInterval [ ] intervals = m.occurrences;
    forEach TimeInterval t : intervals do
        // the method calcXCoords determines the (possibly
        distorted)
        // x-coordinate of a given timestamp
        double startX = calcXCoords(t.startTime);
        double endX = calcXCoords(t.endTime);
        setColor(m.motifColor);
        setBorderColor( according to selection property );
        // draw rectangles vertically centered
        paintRectangle(startX,
            heightOfLineChart / 4 – heightOfMotif.get(m) / 2,
            endX – startX,
            heightOfLineChart / 2 + heightOfMotif.get(m));
    end
end
```

In the pseudocode above, the motifs are provided in an array of motifs represented by Motif [ ]: Motif [ ] allMotifsSorted=sort allMotifs according to average occurrence length in descending order. As specified above, the array of motifs is sorted by the average duration time, in descending order. Next, the height of each rectangle visualizing a corresponding motif is calculated. Also, the layout technique aims to draw rectangles (of the determined heights) in the correct order in the visualization screen.

In some implementations, a relative statistical rank of the average duration time of the motifs is used to calculate heights of motifs. For example, if there are four motifs:

| Avg. Duration: | 4 sec | 10 sec | 11 sec | 13 sec |
|---|---|---|---|---|
| Stat. Rank: | 1 | 2 | 3 | 4 |
| Rel. Stat. Rank: | 0.0 | 0.333 | 0.666 | 1.0 |

The relative statistical rank is computed by the heightOfMotif function in the first "for" loop in the pseudocode above. This relative statistical rank will determine the height of the rectangle.

To draw the motifs of the computed heights into a visualization screen, the second "for" loop in the pseudocode above is executed. The motifs are processed in descending order, since shorter motifs (motifs with shorter height rectangles) are drawn on top of the taller rectangles. For each type of motif, each occurrence of the motif type is drawn as a rectangle with the same calculated height. So all occurrences of the same type of motif will have the same height. Occurrences of different types of motifs have different heights.

Figure 9:
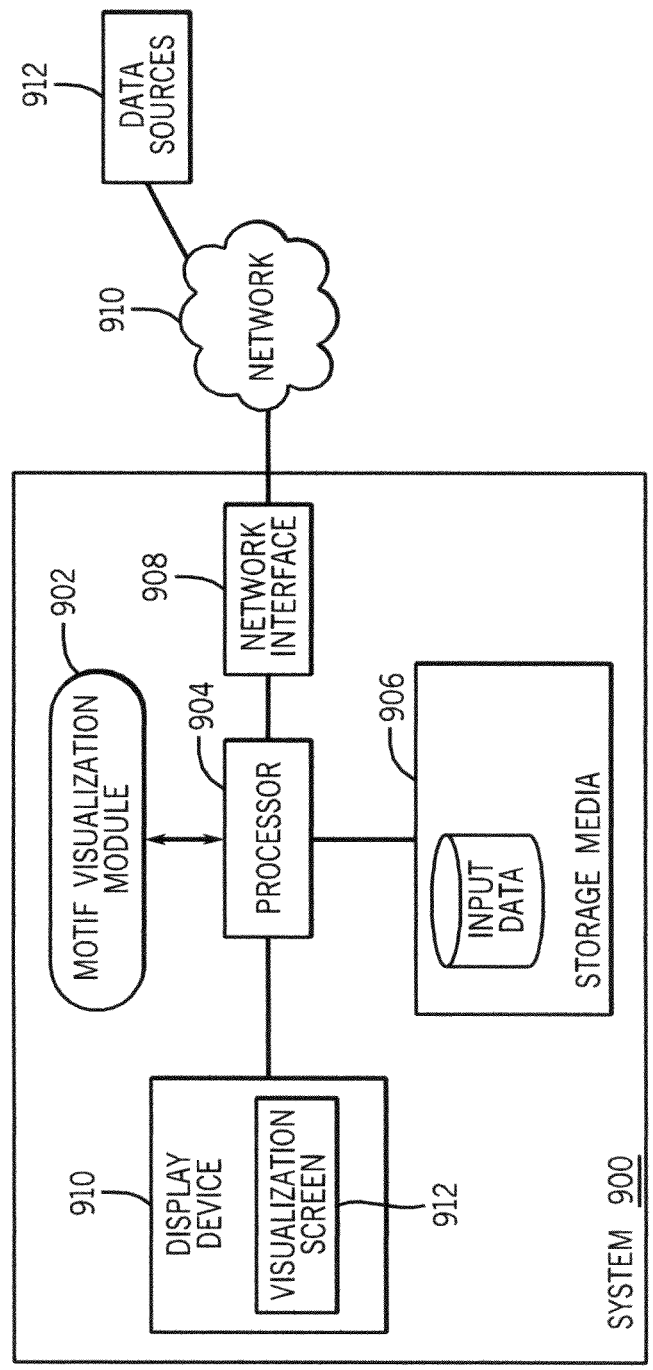
FIG. 9 is a block diagram of an example arrangement incorporating some embodiments.

FIG. 9 is a block diagram of an example arrangement having a system 900 that has a motif visualization module 902 executable on a processor (or multiple processors) 904 to perform tasks of FIG. 3 as well as other tasks discussed above. The processor(s) 904 is (are) connected to a network interface 908 and a storage media 906. The storage media 906 stores an input data set, such as time series data. The network interface 908 allows the system 900 to communicate over a network 910 with remote data sources 912 that can provide input data to the system 900.

The system 900 further includes a display device 910 in which a visualization screen 912 is provided to visualize motifs as provided by the motif visualization module 902.

By using the motif visualization techniques according to some implementations, a user can dynamically adjust (using a motif distortion slider and/or a merge slider) to optimize the desired view. Long events represented by a time series can fit within a visualization screen, with colors assigned to the motif visualization structures (e.g., rectangles) providing indications of an attribute of data items in respective motifs. Large numbers of motifs can be effectively viewed by overlapping and nesting visualization structures of the motifs, which indicates relationships among the different types of motifs.

Using the motif visualization techniques according to some implementations, users can explore motifs and their structures, compare motifs in different regions of data streams, and analyze regions of the data streams in which motifs are not found.

The motif visualization module 902 can include machine-readable instructions that are loaded for execution on processor(s) 904. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
producing, by a system having a processor, visual structures to represent corresponding motifs, wherein the motifs correspond to repeating patterns in an input data set, wherein sizes of the visual structures are based on values of a characteristic associated with the motifs, and wherein a first of the motifs is nested within a second of the motifs to represent a hierarchical relationship of the patterns represented by the first and second motifs;
dividing the input data set into plural parts;
assigning weights to the corresponding plural parts according to densities of a particular type of motifs in the corresponding plural parts;
using the assigned weights to distort the corresponding plural parts;
presenting, by the system, the visual structures of corresponding motifs for display in a visualization screen, wherein the visualization screen depicts data in the input data set with the visual structures overlapping parts of depicted data; and
receiving, by the system, interactive input specifying modification of a region containing motifs, wherein the specified modification includes interactive distortion of the visual structures in the region to change a size of the visual structures in the region.

2. The method of claim 1, further comprising:
receiving a second interactive input specifying another modification of a group of a particular type of adjacent motifs, wherein the another modification includes merging the group of the particular type of adjacent motifs.

3. The method of claim 2, wherein receiving the interactive inputs comprises receiving movements of respective sliders manipulatable by a user.

4. The method of claim 1, wherein each of the plural parts has the same time interval.

5. The method of claim 1, wherein using the assigned weights to distort the corresponding plural parts comprises:
in response to interactive user input to enlarge motif regions, using the weights to enlarge corresponding ones of the parts with larger numbers of motifs; and
in response to interactive user input to enlarge non-motif regions, using inverses of the weights to enlarge corresponding ones of the parts with smaller numbers of motifs.

6. The method of claim 1, further comprising identifying larger motifs that contain smaller motifs to identify superset patterns in the input data set that contain smaller patterns in the input data set.

7. The method of claim 1, further comprising assigning colors to the visual structures, wherein each of the assigned colors represents an attribute of the data associated with the corresponding motif.

8. The method of claim 1, further comprising:
receiving a query containing one or both of an identification of a particular motif of interest and an identification of a particular value of interest; and
in response to the query, highlighting each occurrence of visual structures representing the particular motif.

9. The method of claim 8, further comprising, in response to the query, enlarging each occurrence of the visual structures comprises representing the particular motif.

10. An article comprising at least one non-transitory machine-readable storage medium storing instructions that upon execution cause a system having a processor to:
present, for display in a visualization screen, a representation of data items in a data set and visual structures representing motifs in the data set, wherein the visual structures have different sizes to correspond to different types of motifs;
receive first input to distort regions containing motifs, wherein distorting the regions containing motifs comprises changing sizes of regions containing motifs, including:
dividing the data set into plural regions;
assigning weights to the plural regions based on numbers of motifs in the corresponding plural regions; and
distorting the plural regions using the weights, wherein regions containing larger numbers of motifs are distorted more than regions containing smaller numbers of motifs; and
receive second input to merge a group of a particular type of adjacent motifs.

11. The article of claim 10, wherein the instructions upon execution cause the system to further:
assign colors to the visual structures, wherein each of the assigned colors represents an attribute of the data associated with the corresponding motif.

12. The article of claim 10, wherein the instructions upon execution cause the system to further:
overlap first motifs with second motifs; and
nest third motifs within the first motifs.

13. The article of claim 10, wherein receiving the first input comprises receiving movement of a first slider, and wherein receiving the second input comprises receiving movement of a second slider.

14. The article of claim 10, wherein distorting the regions comprises one of enlarging the regions and shrinking the regions.

15. The article of claim 10, wherein the visual structures include rectangles.

16. The article of claim 10, wherein the different types of motifs are motifs of different time durations, and wherein motifs of a particular type have the same time duration.

17. A system comprising:
a storage media to store time series data; and
at least one processor to:
receive indications of motifs in the time series data, the motifs corresponding to repeating patterns in the time series data;
divide the time series data into plural parts;
assign weights to the corresponding plural parts according to densities of a particular type of motifs in the corresponding plural parts;
generate to display in a visualization screen visual structures of the motifs, wherein different types of motifs are represented by visual structures of different sizes, and wherein some of the visual structures are nested in other visual structures, and some of the visual structures overlap other visual structures;
receive a user input to distort regions of the visualization screen containing the visual structures; and
in response to the user input, distort the corresponding plural parts according to the respective assigned weights.

18. The system of claim 17, wherein the visual structures include rectangles assigned different colors to indicate an attribute of data within respective motifs.

19. The article of claim 10, wherein the motifs correspond to repeating patterns in the data set.

* * * * *